Patented Mar. 17, 1942

2,276,921

UNITED STATES PATENT OFFICE 2,276,921

PROCESS FOR THE REGENERATION OF CATALYSTS

Ralph Lyman Brown, Bala-Cynwyd, Pa., assignor to The Solvay Process Company, New York, N. Y., a corporation of New York No Drawing. Application September 26, 1939, Serial No. 296,625

6 Claims. (Cl. 260—449)

This invention relates to a process for the regeneration of catalysts which have become contaminated with the metals or oxides thereof of the iron group; i. e., iron, nickel and cobalt.

Catalysts free from iron, nickel or cobalt or compounds of these metals reducible by CO under the conditions under which the reaction is conducted, are used in carrying out numerous types of chemical reactions, particularly reactions in which carbon monoxide and hydrogen or a material containing hydrogen is contacted with the catalyst. The following are examples of reactions employed for the production of oxygenated organic compounds and of catalytic materials which are known to be suitable as contact agents for these reactions:

1. The reaction of an alcohol with carbon monoxide to form an acid; e. g., the reaction of methanol and carbon monoxide to form acetic acid or an acid containing a greater number of carbon atoms than acetic acid. Suitable catalysts are those containing hydrated tungsten oxide disclosed in U. S. P. 1,998,220, which issued April 16, 1935, to Ralph L. Brown, or acid salts of phosphoric, boric, or silicic acids as disclosed in U. S. P. 1,963,119 of June 19, 1934 to Henry Dreyfus.

2. The reaction of hydrogen when carbon monoxide to form methanol or other oxygenated organic compounds. Suitable catalysts for this reaction are combinations of zinc oxide and chromium oxide as disclosed in U. S. P. 1,558,559 of October 27, 1925, to Alwin Mittasch et al.; copper as disclosed in U. S. P. 1,681,750 of August 21, 1928 to Henry A Storch; zinc or the oxide or carbonate thereof or zinc and copper or their oxides or carbonates as described in U. S. P. 1,746,781 of February 11, 1930 to Wilbur A. Lazier; zinc or manganese chromite as described in U. S. P. 1,746,782 of February 11, 1930, to Wilbur A. Lazier.

3. The dehydrogenation and dehydration of organic substances; e. g., the production of formaldehyde and of methyl alcohol from formic acid. A suitable catalyst for this reaction is zinc oxide as disclosed in U. S. P. 1,668,838 of May 8, 1928, to Grover Bloomfield.

The invention is not limited, however, to these specific reactions or catalysts but is applicable to the regeneration of any catalysts which are active for the catalysis of gases when free from the metals of the iron group and compounds thereof reducible by carbon monoxide under the conditions of the catalysis, and which have become contaminated with iron, nickel or cobalt or a compound thereof which is reducible by carbon monoxide, such as the oxide of the metal. The process of this invention is particularly useful, however, as a method for the regeneration of catalysts which have become contaminated with iron or iron oxide during use as contact bodies for the reaction of carbon monoxide with hydrogen or materials containing hydrogen to form an oxygenated organic compound and, accordingly, will be hereinafter described particularly in its application to such catalysts, although not limited thereto.

In the production of oxygenated organic compounds such as methanol and acetic acid from carbon monoxide and hydrogen or methanol, it has been found the synthesis reaction may initially proceed smoothly and with good yields of the desired products but in the course of time there is a progressive decrease in the efficiency of the reaction and there may even be a sudden practically complete loss of activity of the catalyst. Furthermore, there may be a progressive increase in the amounts of undesirable by-products resulting from side reactions, such as the formation of hydrocarbons or other equally undesirable products.

One cause of the loss in activity of the catalysts for the synthesis of the desired oxygenated organic compounds and increase in the amounts of undesired by-products is contamination of the catalyst with iron as, for example, with iron oxide or carbonate dust which may accidentally get into the synthesis apparatus or with metallic iron resulting from corrosion of iron alloys used for the synthesis apparatus and consequent deposit of products of corrosion in the catalyst. Where gases containing carbon monoxide are contacted with surfaces consisting of an alloy of a ferrous metal at elevated temperatures the carbon monoxide may react with the ferrous metal to form the corresponding metal carbonyl, which is vaporized into the gas on its way to the catalyst. In the catalyst, at the high temperatures at which it is maintained, the carbonyl may be decomposed to deposit its metal constituent in the catalyst. This causes a loss in the activity of the catalyst as the amount of metal of the iron group accumulating therein increases.

It is an object of this invention to provide a process whereby the catalysts which have become contaminated with a metal of the iron group may be regenerated in place in the synthesis apparatus. In commercial operation of any catalytic process it is highly undesirable and greatly increases the production costs if it is necessary to cool off the catalyst converters, remove the catalyst charge therefrom and recharge with new catalyst or regenerated catalyst. The time element involved in having to let the large commercial units used in catalytic synthesis cool down so as to permit of their being opened and then placed under pressure and reheated to get back to the conditions required for synthesis, involves a period not of hours but of a day or more during which operation of the converter is suspended. When the synthesis is carried out under high pressures, it is undesirable to have to open up the converter and again close it and make it gas-tight under the high pressures. It is, therefore, of great significance to provide a procedure in which it is unnecessary to remove the catalyst from the apparatus or to change greatly the temperature and pressure conditions in the converter and yet be able to regenerate effectively and restore to activity the contaminated catalyst.

I have discovered that a catalyst contaminated with a metal of the iron group may be freed of the contaminating metal by maintaining the catalyst at 100° C. to 300° C. and flowing in direct contact therewith a gas containing carbon monoxide in which the partial pressure of carbon monoxide is at least 50 atmospheres and which contains an amount of ferrous metal carbonyl less than the equilibrium concentration of the metal carbonyl in the gas at the temperature at which the gas is contacted with the catalyst. Under these conditions of temperature and gas composition, the carbon monoxide in the gas reacts with the metal of the iron group in the catalyst to form the corresponding metal carbonyl and that carbonyl is vaporized and swept from the catalyst in the stream of gas flowing therethrough.

In carrying out the process of this invention I may use a gas containing more than 60% carbon monoxide by volume on a dry basis and preferably a gas containing 90% or more carbon monoxide. Furthermore, it is preferred the carbon monoxide gas be contacted with the contaminated catalyst at a carbon monoxide partial pressure of about 200 to 300 atmospheres and at a temperature of about 200° C. However, the catalyst may be readily freed of the contaminating metal of the iron group by treatment with a gas in which the partial pressure of carbon monoxide is about 200 to 300 atmospheres at temperatures of 100° to 300° C. The gas may be flowed through the catalyst at space velocities of 500 or higher (calculated as volumes of dry gas at S. T. P. per unit volume of catalyst per hour).

The process of this invention is particularly useful in connection with processes for the synthesis of oxygenated organic compounds from gases containing carbon monoxide which are contacted with the catalyst at temperatures above 300° C. In such processes precautions are taken to prevent iron carbonyl from being present in the gas introduced into contact with the catalyst. It frequently occurs, however, that small quantities of iron carbonyl get into the gases and at the high temperatures reigning in the catalyst are decomposed and iron deposited. When the carbon monoxide partial pressure in these synthesis gases is at least 50 atmospheres, in order to remove deposited iron from the catalyst in accordance with the process of this invention, the catalyst temperature is lowered to 100° to 300° C., preferably to 200° C., while continuing passage of the carbon monoxide gas through the catalyst. In all practical cases this decrease in temperature (without other change in the procedure) will be effective to remove the iron from the catalyst, after which the catalyst may be raised to synthesis temperatures and the synthesis procedure continued. In the improbable case in which the incoming carbon monoxide gas contains sufficient iron carbonyl so that the gas is at or above equilibrium concentration of the carbonyl at the temperature of 100° to 300° C. to which the catalyst is reduced, the amount of carbonyl in the gas should be decreased so that the gas will effectively react with the iron in the catalyst. The desired decrease in carbonyl content of the gas may be accomplished by maintaining the gas at or below atmospheric temperature or by heating it to temperatures above 300° C. to decompose carbonyl in the gas prior to contacting the gas with the catalyst at temperatures of 100° to 300° C.

As pointed out above, the regeneration treatment of the catalyst which has been contaminated during use for the treatment of gases containing carbon monoxide may differ only from the conditions maintained during the catalysis of the gases in a lowering of the temperature at which the catalyst is maintained. It is preferred, however, during this regeneration treatment not to supply to the catalyst the constituents in the synthesis gas which react with the carbon monoxide during the synthesis reaction. During the regeneration treatment these other constituents of the gas merely serve as diluents for the carbon monoxide, thereby decreasing its effectiveness in regenerating the catalyst.

It is apparent from the foregoing the temperature and carbon monoxide concentration in a gas which will be effective for regenerating a catalyst which has become contaminated with iron, nickel, or cobalt in a precedent catalysis of a carbon monoxide gas by contact with the catalyst will be related to and one or both will differ from the conditions under which the catalysis procedure is carried out. When in the catalysis step a temperature above 300° C. is employed, in the regeneration step the temperature is lowered to approach materially closer to a temperature of 200° C. than the temperature employed in the catalysis step and to be in the range of 100° C. to 300° C. With respect to the carbon monoxide concentration in the gases, in carrying out the regeneration step the gas passed in contact with the catalyst is preferably, though not necessarily, one containing an increased concentration of carbon monoxide as compared with the catalysis gas.

The apparatus in which the hot gases are contacted with the catalyst both in the synthesis and in the regeneration steps is preferably constructed of a metal other than one belonging to the iron group (i. e., iron, cobalt or nickel) or of an alloy of a metal of the iron group which is substantially more resistant to corrosion by and reaction with carbon monoxide to form a carbonyl than iron and carbon steel. Among ferrous alloys suitable for construction of the apparatus in which the hot gases are contacted with metal surfaces of the apparatus are the alloy steels containing a high proportion of molybdenum, tungsten, chromium or manganese. For example, chrome iron alloys containing 28% or more chromium, the remainder principally iron, may be employed for construction of the apparatus.

The following examples are illustrative of methods of carrying out the process of this invention but the invention is not limited thereto:

*Example I.*—Oxygenated organic compounds are synthesized by the procedure of Example IV of my United States Patent 1,998,220 which issued April 16, 1935. In carrying out this synthesis procedure a catalyst, principally consisting of hydrated tungsten oxide but containing in addition thereto aluminum oxide, beryllium oxide and bismuth oxide, is placed in a converter capable of withstanding the temperature and pressure conditions of operation. A gas containing the following proportions of ingredients 6.8 mols CO, 4.6 mols hydrogen, 1 mol methanol, and 4 mols water vapor is contacted in the converter with the catalyst under a pressure of 300 atmospheres, a temperature of about 385° C. and at a space velocity of 4000. Before contacting with the catalyst the gas mixture is preheated to a temperature sufficiently high to maintain the desired catalyst operating temperature of about 385° C. The interior surfaces of the converter and of the heat exchanger with which the gases prior to contact with the catalyst come into contact are formed of a 28% chrome iron alloy.

After operating this synthesis procedure for a period of time it will be noted the efficiency of the catalytic conversion has fallen off and more of the undesirable side reactions are occurring, particularly the side reactions resulting in the formation of hydrocarbons. At this point the above synthesis gas, in which the partial pressure of carbon monoxide is about 125 atmospheres with the total pressure being 300 atmospheres, is substituted by a gas consisting of a mixture of 90% carbon monoxide and 10% hydrogen to which about 0.048 volume of steam per volume of gas is added. The resulting gas contains about 86% carbon monoxide, 9.5% hydrogen and 4.5% steam by volume. At 300 atmospheres, the partial pressure of carbon monoxide in this gas is about 260 atmospheres. This gas is passed through the catalyst under 300 atmospheres pressure at a space velocity of 4300, calculated as liters of dry gas per hour per liter of catalyst. At the same time the supply of heat to the heat exchangers is reduced so that the gas is heated to 200° C. and at this temperature is contacted with the catalyst. The gas leaving the catalyst is passed to storage from which it may subsequently be withdrawn and used to prepare the raw gas for a later synthesis of oxygenated organic compounds by contact with the regenerated catalyst under the above synthesis conditions. After the catalyst has been treated to regenerate it in the manner described for about 5 hours, the regenerating gas is substituted by the above synthesis gas, the space velocity and temperature are adjusted to conform to the above synthesis conditions and the synthesis of oxygenated organic compounds is proceeded with. It will be found that by the described regeneration treatment the activity of the catalyst for the synthesis of the oxygenated organic compounds has been materially increased and the amount of side reactions has been decreased.

*Example II.*—The synthesis of oxygenated organic compounds is carried out in accordance with the process of Example V of my above United States Patent 1,998,220. In this synthesis procedure a tungsten oxide-aluminum oxide-beryllium oxide-bismuth oxide catalyst is used for the synthesis of oxygenated organic compounds from a gas having a composition corresponding to 9.1 mols CO, 2.3 mols $H_2$, 1.0 mol methanol and 4 mols water vapor, under a pressure of 680 atmospheres, a space velocity of 16,000 and a temperature of about 395° C. When the catalyst shows a substantial decrease in activity for the formation of oxygenated organic compounds or increase in the amounts of undesired by-products formed, the above gas mixture is substituted by the regeneration gas of Example I above and the temperature of the catalyst reduced to 200° C., the pressure on the gas contacted with the catalyst reduced to 300 atmospheres and the space velocity of passage of the gas through the catalyst is reduced to 4300. After subjecting the catalyst to this regeneration treatment for about 5 hours, the regeneration gas is substituted by the above synthesis gas and the operating conditions brought back to the described synthesis conditions.

In this process the partial pressure of carbon monoxide in the synthesis gases is about 380 atmospheres and in the regeneration gas is about 260 atmospheres. The effective regeneration condition is the reduction in the temperature at which the gases are contacted with the catalyst from 395° C. of the synthesis operation to the 200° C. of the regeneration treatment. The use of a lower total pressure, and hence lower carbon monoxide partial pressure, for regeneration than in the synthesis step is primarily an economical expedient, since the cost of compressing the gas to the lower pressure is less than the cost of compressing to the higher synthesis pressure and by lowering the temperature the regeneration treatment is effective at the lower pressure.

*Example III.*—The synthesis of methanol is carried out employing reduced normal zinc chromate as catalyst. The synthesis gases consist of about 67% $H_2$ and 33% CO at a pressure of 200 atmospheres and pass the catalyst at a temperature of about 320° C. The partial pressure of carbon monoxide in this gas is about 65 atmospheres. When after prolonged operation, the activity of the catalyst is found to fall off, the catalyst is regenerated by substituting for the above synthesis gas a gas containing 90% CO and 10% $H_2$. The temperature of the catalyst is reduced to about 200° C. and the gas is passed through the catalyst at a space velocity of about 4000 and under 200 atmospheres pressure. The partial pressure of carbon monoxide in the regeneration gas is 180 atmospheres. After treatment in this manner for about 3 hours, the synthesis procedure is resumed by substituting the synthesis gas containing 67% $H_2$ and 33% CO for the regenerating gas, and by raising the temperature to 320° C.

Numerous changes and modifications in the specific procedures set forth in the above examples may be made without departing from the scope of this invention.

The advantages of the regeneration procedures of this invention are apparent and are of great practical importance. The catalyst is regenerated without the necessity of separate chemical purification and physical reworking of the catalyst material. The regeneration is carried out with the catalyst in situ and with comparatively little loss of operating time of the catalysis system. The pressure conditions in the system need not be varied. There is but a limited change in the temperature of the catalyst, generally a lowering in temperature from the catalysis temperatures, which may be quickly attained in starting the regeneration treatment and again in recommencing the catalysis step the catalyst may be relatively quickly brought up to operating temperature. The effective life of a catalyst is greatly prolonged by its repeated regeneration whenever it shows a substantial loss in activity in the catalysis step. The amount of side reactions leading to undesirable by-products may be maintained substantially at a minimum rate throughout the entire life of the catalyst.

The presence of steam in the gas used for regenerating the catalyst may be found advantageous in some cases. Thus, steam may be employed when it is found desirable to prevent the formation of carbon in regenerating the catalyst. The steam may be mixed with the carbon monoxide used for regenerating the catalyst in amounts such that the partial pressure of water vapor in the carbon monoxide gas is at least 1 atmosphere. The gas may, if desired, be substantially saturated with water vapor at the temperature and pressure of contact with the catalyst.

I claim:

1. In a process for the catalysis of a gas to promote a chemical reaction therein by direct contact with a catalyst substantially free from metals of the iron group and compounds of said metals which are reducible by carbon monoxide under the conditions of the catalysis of said gas, wherein contamination of the catalyst with material from the group consisting of the metals of the iron group and compounds thereof reducible by carbon monoxide and resulting loss of activity of the catalyst occurs during passage of the catalysis gas in contact with the catalyst, that improvement which comprises regenerating the activity of the catalyst thus contaminated by heating the contaminated catalyst at 100° to 300° C. and flowing in direct contact with the thus heated catalyst a gas containing carbon monoxide in which the carbon monoxide partial pressure is at least 50 atmospheres and which contains an amount of carbonyl of a metal of the iron group less than the equilibrium concentration of the metal carbonyl in said gas containing carbon monoxide at the temperature at which the gas is flowed in contact with the contaminated catalyst, thereby removing from said catalyst the metal of the iron group contaminating the catalyst.

2. In a process for the catalysis of a gas to promote a chemical reaction therein by direct contact with a catalyst substantially free from metals of the iron group and compounds of said metals which are reducible by carbon monoxide under the conditions of the catalysis of said gas, wherein contamination of the catalyst with material from the group consisting of the metals of the iron group and compounds thereof reducible by carbon monoxide and resulting loss of activity of the catalyst occurs during passage of the catalysis gas in contact with the catalyst, that improvement which comprises regenerating the activity of the catalyst thus contaminated by heating the contaminated catalyst at 100° to 300° C. and flowing in direct contact with the thus heated catalyst a gas containing carbon monoxide in which the carbon monoxide partial pressure is 200 to 300 atmospheres and which contains an amount of carbonyl of a metal of the iron group less than the equilibrium concentration of the metal carbonyl in said gas containing carbon monoxide at the temperature at which the gas is flowed in contact with the contaminated catalyst, thereby removing from said catalyst the metal of the iron group contaminating the catalyst.

3. In a process for the catalysis of a gas to promote a chemical reaction therein by direct contact with a catalyst substantially free from iron and compounds thereof which are reducible by carbon monoxide under the conditions of the catalysis of said gas, wherein contamination of the catalyst with material from the group consisting of iron and compounds thereof reducible by carbon monoxide and resulting loss of activity of the catalyst occurs during passage of the catalysis gas in contact with the catalyst, that improvement which comprises regenerating the activity of the catalyst thus contaminated by heating the contaminated catalyst at about 200° C. and flowing in direct contact with the thus heated catalyst a gas containing carbon monoxide in which the carbon monoxide partial pressure is 200 to 300 atmospheres and which contains an amount of iron carbonyl less than the equilibrium concentration of iron carbonyl in said gas containing carbon monoxide at 200° C., thereby removing from said catalyst the iron contaminating the catalyst.

4. In a process wherein an oxygenated organic compound is formed by passing a catalysis gas containing carbon monoxide and a hydrogen-containing material reacting therewith to form said oxygenated organic compound in contact with a catalyst at temperatures above 300° C. and pressures at which the partial pressure of carbon monoxide in the gas contacted with the catalyst is at least 50 atmospheres, said catalyst being substantially free from metals of the iron group and compounds thereof which are reducible by carbon monoxide under the conditions of catalysis of said gas, and wherein after prolonged contact of the catalyst with said gas the catalyst becomes contaminated with material from the group consisting of the metals of the iron group and compounds thereof reducible by carbon monoxide, that improvement which comprises interrupting the catalysis procedure and regenerating in situ in the apparatus wherein said gas is catalyzed the activity of the contaminated catalyst by lowering the temperature of the contaminated catalyst to between 100° C. and 300° C. and flowing in contact with the contaminated catalyst a gas in which the partial pressure of carbon monoxide is at least 50 atmospheres, thereby removing from the catalyst metal of the iron group contaminating it, and thereafter resuming the passage of the catalysis gas in contact with the catalyst under the conditions heretofore described.

5. In a process wherein an oxygenated organic compound is formed by passing a catalysis gas containing carbon monoxide and a hydrogen-containing material reacting therewith to form said oxygenated organic compound in contact with a catalyst at temperatures above 300° C. and pressures at which the partial pressure of carbon monoxide in the gas contacted with the catalyst is at least 50 atmospheres, said catalyst being substantially free from iron and compounds thereof which are reducible by carbon monoxide under the conditions of catalysis of said gas, and wherein after prolonged contact of the catalyst with said gas the catalyst becomes contaminated with material from the group consisting of iron and compounds thereof reducible by carbon monoxide, that improvement which comprises interrupting the catalysis procedure and regenerating in situ in the apparatus wherein said gas is catalyzed the activity of the contaminated catalyst by lowering the temperature of the contaminated catalyst to about 200° C. and flowing in contact with the contaminated catalyst a gas in which the percentage of carbon monoxide is higher than in said catalysis gas and the partial pressure of carbon monoxide is at least 50 atmospheres, thereby removing from the catalyst iron contaminating it, and thereafter resuming the passage of the catalysis gas in contact with the catalyst under the conditions heretofore described.

6. In a process for the synthesis of methanol wherein a catalysis gas containing carbon monoxide and hydrogen is passed in contact with a catalyst promoting the reaction of the hydrogen and carbon monoxide to form said methanol at a temperature above 300° C. and wherein after prolonged contact with the catalyst with said gas the catalyst becomes contaminated with iron, that improvement which comprises interrupting the catalyst procedure and regenerating in situ in the apparatus wherein said gas is catalyzed the activity of the contaminated catalyst by lowering the temperature of the catalyst to about 200° C. and flowing in contact with the catalyst a gas in which the partial pressure of carbon monoxide is about 200 atmospheres, thereby removing from the catalyst iron contaminating it, and thereafter resuming the passage of the catalysis gas in contact with the catalyst under the conditions heretofore described.

RALPH LYMAN BROWN.